United States Patent
Sampath et al.

(10) Patent No.: US 9,912,592 B2
(45) Date of Patent: Mar. 6, 2018

(54) TROUBLESHOOTING OPENFLOW NETWORKS

(71) Applicant: HEWLETT-PACKARD DEVELOPMENT COMPANY, L.P., Houston, TX (US)

(72) Inventors: Rangaprasad Sampath, Bangalore (IN); Ramasamy Apathotharanan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 58 days.

(21) Appl. No.: 15/024,176

(22) PCT Filed: Sep. 23, 2013

(86) PCT No.: PCT/IN2013/000571
§ 371 (c)(1),
(2) Date: Mar. 23, 2016

(87) PCT Pub. No.: WO2015/040625
PCT Pub. Date: Mar. 26, 2015

(65) Prior Publication Data
US 2016/0234114 A1    Aug. 11, 2016

(51) Int. Cl.
*H04L 12/28* (2006.01)
*H04L 12/741* (2013.01)
(Continued)

(52) U.S. Cl.
CPC .......... *H04L 45/745* (2013.01); *H04L 41/069* (2013.01); *H04L 43/50* (2013.01);
(Continued)

(58) Field of Classification Search
CPC ..... H04L 41/069; H04L 43/50; H04L 45/745; H04L 47/31; H04L 61/2592; H04L 69/22
See application file for complete search history.

(56) References Cited

U.S. PATENT DOCUMENTS 8,908,539 B1 * 12/2014 Pani .................... H04L 43/0811
370/248
2005/0058083 A1 * 3/2005 Rogers ................ H04L 12/5601
370/252
(Continued)

FOREIGN PATENT DOCUMENTS

CN     102523166 A    6/2012
CN     102946325 A    2/2013
(Continued)

OTHER PUBLICATIONS

"Floodlight is an open SDN Controller," 2011, 1-page, OpenFlowHub.org.
(Continued)

*Primary Examiner* — Kan Yuen
(74) *Attorney, Agent, or Firm* — Hewlett-Packard Enterprise Patent Department (57) ABSTRACT

Provided is a method of troubleshooting an OpenFlow network. A test packet is sent to a test node on the OpenFlow network. A response from the test node is validated against an expected response. If the response is consistent with the expected response, a modified test packet is sent to a further test node on the OpenFlow network. If the response is inconsistent with the expected response, a notification is provided to a user.

19 Claims, 6 Drawing Sheets

(51) Int. Cl.
  *H04L 12/26* (2006.01)
  *H04L 12/24* (2006.01)
  *H04L 12/833* (2013.01)
  *H04L 29/12* (2006.01)
  *H04L 29/06* (2006.01)

(52) U.S. Cl.
  CPC .......... *H04L 47/31* (2013.01); *H04L 61/2592* (2013.01); *H04L 69/22* (2013.01)

(56) References Cited

U.S. PATENT DOCUMENTS

| | | |
|---|---|---|
| 2011/0286324 A1 | 11/2011 | Bellagamba et al. |
| 2013/0010600 A1 | 1/2013 | Jocha et al. |
| 2014/0192646 A1* | 7/2014 | Mir .................... H04L 43/0829 370/235 |

FOREIGN PATENT DOCUMENTS

| | | |
|---|---|---|
| WO | WO-2012/066830 A | 5/2012 |
| WO | WO-2012/177213 A2 | 12/2012 |
| WO | WO-2013/031175 A1 | 3/2013 |
| WO | WO-2013/044956 A1 | 4/2013 |

OTHER PUBLICATIONS

"OpenFlow Switch Specification," Jun. 25, 2012, pp. title, 1-105, Version 1.3.0 (Wire Protocol 0x04), Open Networking Foundation.

"Software-Defined Networking: The New Norm for Networks," Apr. 13, 2012, pp. 1- 12, ONF White Paper, Open Networking Foundation.

David Erickson, "What is Beacon," Feb. 4, 2013, pp. 1-3, OpenFlow.

Hongyi Zing et al., "Automatic Test Packet Generation," Jul. 16, 2012, pp. 1-13.

International Search Report and Written Opinion, International Application No. PCT/IN2013/000571, dated Jun. 30, 2014, pp. 1-9.

* cited by examiner

TROUBLESHOOTING OPENFLOW NETWORKS

BACKGROUND

OpenFlow is a leading protocol for Software-defined Networking (SDN) architecture. In OpenFlow network, data forwarding on a network device is controlled through flow table entries populated by an OpenFlow controller that manages the control plane for that network. A network device that receives packets on its interfaces looks up its flow table to check the actions that need to be taken on a received frame. By default an OpenFlow enabled network device creates a default flow table entry to send all packets that do not match any specific flow entry in the table to the OpenFlow Controller. In this manner, the OpenFlow controller becomes aware of all new network traffic coming in on a device and programs a flow table entry corresponding to a new traffic pattern on the receiver network device for subsequent packet forwarding of that flow.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

In a software defined networking paradigm with Open-Flow capable switches, a centralized software based controller application is aware of all the devices and their points of interconnection and manages the control plane for that network. OpenFlow technology de-couples data plane from the control plane in such a way that the data plane will reside on the switch while the control plane is managed on a separate device, commonly referred to as the OpenFlow controller. Based on the control plane decisions, the forwarding rules are programmed on to the switches via the OpenFlow protocol. The switches consult this table when actually forwarding packets in data plane. Each forwarding rule has an action that dictates how traffic that matches the rule would need to be handled.

The controller typically learns of the network topology by having OpenFlow capable switches forward Link Layer Discovery Protocol (LLDP) advertisements received on their links (from peer switches) to the controller and thereby learning of all switches in the network and their points of interconnection. Note that the assumption here is that LLDP continues to run on the switches though it is also a control plane protocol. Alternatively, the topology can be statically fed into the controller by the administrator. Now the controller can run its choice of programs to construct a data path that connects every node in the network to every other node in the network as appropriate.

When an application or user traffic enters the first OpenFlow capable (edge) switch, it looks up an OpenFlow data path table to see if the traffic matches any flow rule already programmed in the table. If the traffic does not match any flow rule, it is regarded as a new flow and the switch forwards it to the OpenFlow controller seeking inputs on how the frame needs to be forwarded by the switch. The controller then decides a forwarding path for the flow and sends the decision via the OpenFlow protocol to the switch which in turn programs its data path table with this flow information and the forwarding action. Subsequent traffic matching this flow rule would be forwarded by the switch as per the forwarding decision made by the OpenFlow controller.

Figure 2:
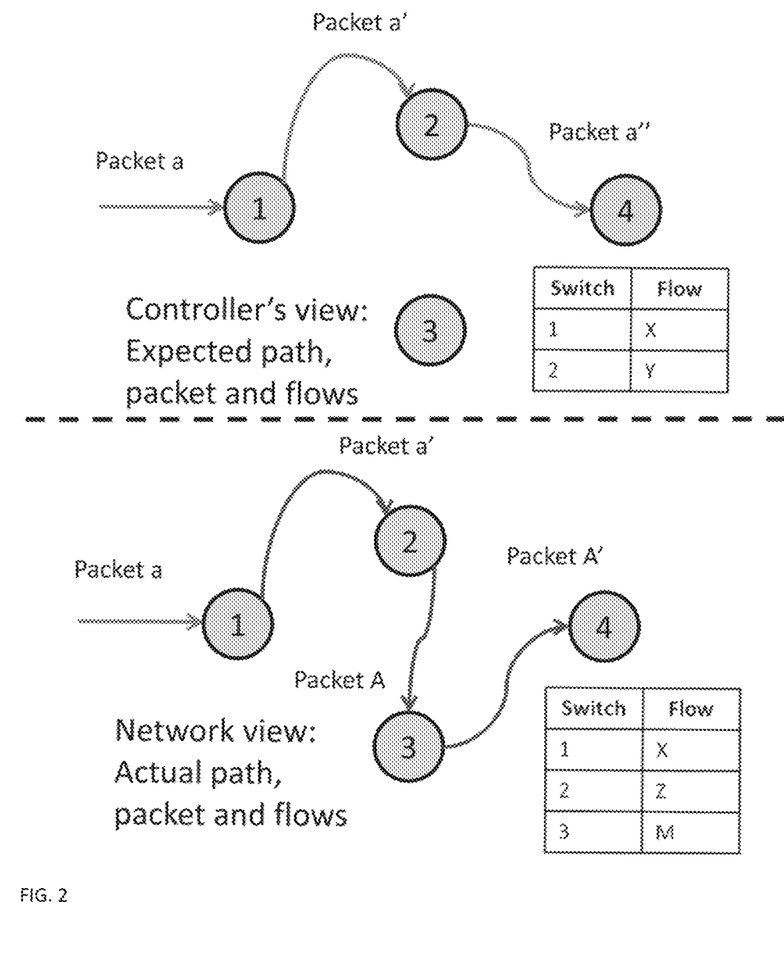
FIG. 2 illustrates an expected versus actual path taken by a packet in an Open Flow-based network, according to an example.

Thus, an OpenFlow controller is fully aware of the network state i.e. the flow table of every switch and the flow that will be hit when a packet of a certain type comes in to the switch. Based on these, it can compute the "expected path" that a packet may take in an OpenFlow network. In other words, an "expected path" is the controller's view and expectation that a packet may take in an OpenFlow network, which may differ from the "actual path" taken by a packet in the network (as illustrated in FIG. 2). For example, there may be cases where OpenFlow flows in switches have LOCAL or NORMAL actions which may result in handing over of the packets to legacy switch processing, flows that have an action to DROP packets, flows that forward packets to different ports etc. In other words, there could be discrepancies between what the controller thinks will happen on the network and what will actually happen on the network. These discrepancies could be due to a variety of reasons such as controller connection interruptions followed by reconnection, switch side operations resulting in flow deletions, inability of controllers to maintain consistency of network path programming etc. A consequence of such discrepancies is that it becomes difficult to troubleshoot a network issue such as why packets did not reach a specific node.

Proposed is a troubleshooting solution for OpenFlow-based networks. In an implementation, proposed solution enables identification of discrepancies, for instance, between an expected network path and the actual path taken by packets in an OpenFlow network, between a flow that was expected to be used on an OpenFlow switch and the one that was actually used, and between a packet that was meant to go out of an OpenFlow switch and the one that actually went out.

Figure 1:
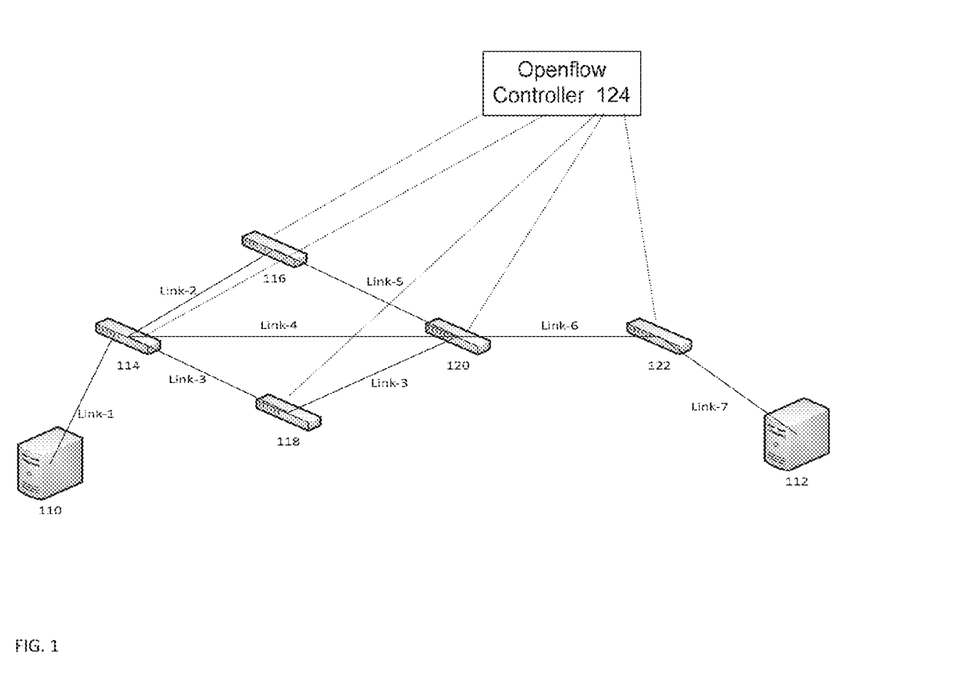
FIG. 1 is a schematic block diagram of an OpenFlow-based network system, according to an example.

FIG. 1 is a schematic block diagram of an OpenFlow-based network system, according to an example.

Computer network system 100 includes host computer systems 110 and 112, network devices 114, 116, 118, 120, and 122, and OpenFlow controller 124. In an implementation, computer network system 100 is based on Software-defined Networking (SDN) architecture.

Host computer systems 110 and 112 are coupled to network devices 114 and 122 respectively. Host computer systems 110 (Host-1) and 112 (Host-2) may be a desktop computer, notebook computer, tablet computer, computer server, mobile phone, personal digital assistant (PDA), and the like.

OpenFlow controller 124 is coupled to network devices 114, 116, 118, 120, and 122, over a network, which may be wired or wireless. The network may be a public network, such as, the Internet, or a private network, such as, an intranet. The number of network devices 114, 116, 118, 120, and 122 illustrated in FIG. 1 is by way of example, and not limitation. The number of network devices deployed in a computer network system 100 may vary in other implementations. Similarly, computer network system 100 may comprise any number of host computer systems in other implementations.

Network devices 114, 116, 118, 120, and 122 may include, by way of non-limiting examples, a network switch, a network router, a virtual switch, or a virtual router. In an implementation, network devices 114, 116, 118, 120, and 122 are Open-Flow enabled devices. Each network device 114, 116, 118, 120, and 122 may include an OpenFlow agent module for forwarding network probe packets generated by an OpenFlow (or SDN) application based on the forwarding rules and action set programmed on the network device. The action set may include selection of an output port for the probe packet and addition of a timestamp onto a frame before forwarding if instructed by OpenFlow controller 124.

OpenFlow controller system 124 is software (machine executable instructions) which controls OpenFlow logical switches via the OpenFlow protocol. More information regarding the OpenFlow can be obtained, for instance, from web links https://www.opennetworking.org/images/stories/downioads/sdn-resources/onf-specifications/openflow/openflow-spec-v1.0.0.pdf and https://www.opennetworking.org/images/stories/downloads/of-config/of-config-1.1.pdf. OpenFlow is an open standard communications protocol that gives access to the forwarding plane of a network switch or router over a network. It provides an open protocol to program a flow table in a network device (such as, a router) thereby controlling the way data packets are routed in a network. Through OpenFlow, the data and control logic of a network device are separated, and the control logic is moved to an external controller such as OpenFlow controller system 124. The OpenFlow controller system 124 maintains all of network rules and distributes the appropriate instructions to network devices 114, 116, 118, 120, and 122. It essentially centralizes the network intelligence, while the network maintains a distributed forwarding plane through OpenFlow-enabled network devices.

In an implementation, OpenFlow controller 124 includes a network troubleshooting application comprising an input generator module, a packet generator module, a timeout engine, a validation engine, a flow receiver module, a notification engine and a topology module. Network troubleshooting application and its components are described in detail with reference to FIG. 3 below.

Figure 3:
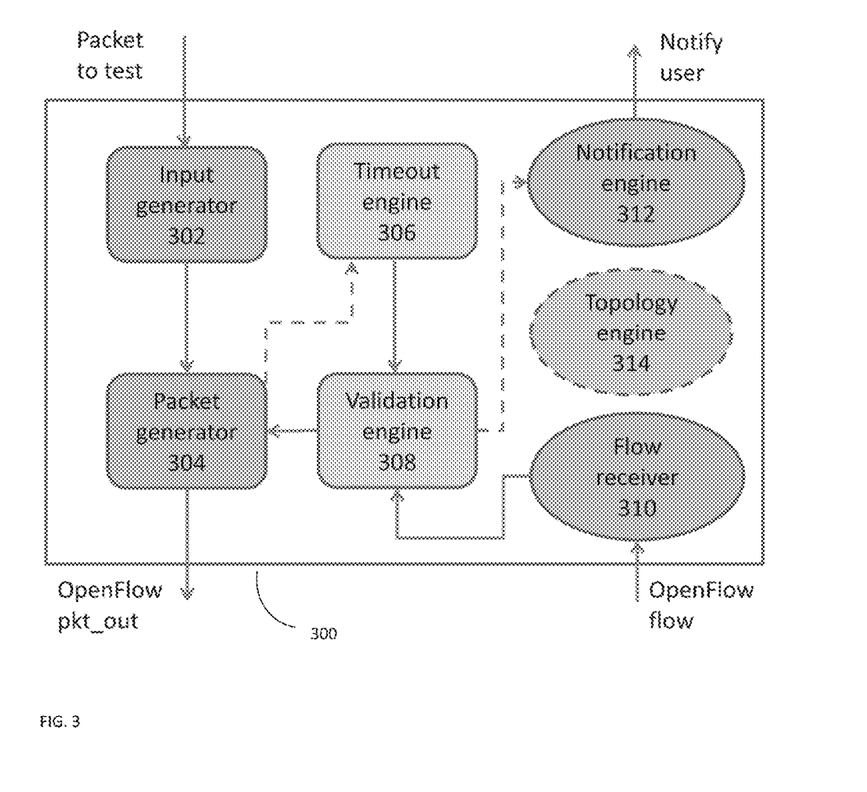
FIG. 3 is a schematic block diagram of a network troubleshooting application, according to an example.

FIG. 3 is a schematic block diagram of network troubleshooting application, according to an example. Network troubleshooting application 300 comprises of input generator module 302, packet generator module 304, timeout engine 306, validation engine 308, flow receiver module 310, notification engine 313 and topology module 314. Input generator module 302 identifies a test packet and a test node to be used in a troubleshooting or diagnostic test to be performed on an OpenFlow-based network. Packet generator module 304 inserts a test packet at a test node. A test-packet is a designated packet with one or multiple marker bits or flags set in it, which is specifically used for diagnostic purposes. In an implementation, packet generator module 304 instructs an OpenFlow controller to send a pkt_out message to a test node encapsulating a test packet and setting the OpenFlow action for that pkt_out message as OFPP_TABLE. Timeout engine 306 implements a timer and starts it every time a test packet is sent. If a timeout occurs, timeout engine 306 notifies validation engine 308. Flow receiver module 310 receives a flow sent by a test node in response to a test packet. Validation engine 308 is an analysis module that compares an actual or received flow with an expected flow, an actual path with an expected path and an actual packet with an expected packet. If validation engine 308 finds a discrepancy, it triggers notification engine 312. The latter notifies the discrepancy to a user. An application on an OpenFlow network may have its own topology module or it may rely on topology module 314 implemented by an underlying OpenFlow controller 124.

Figure 4:
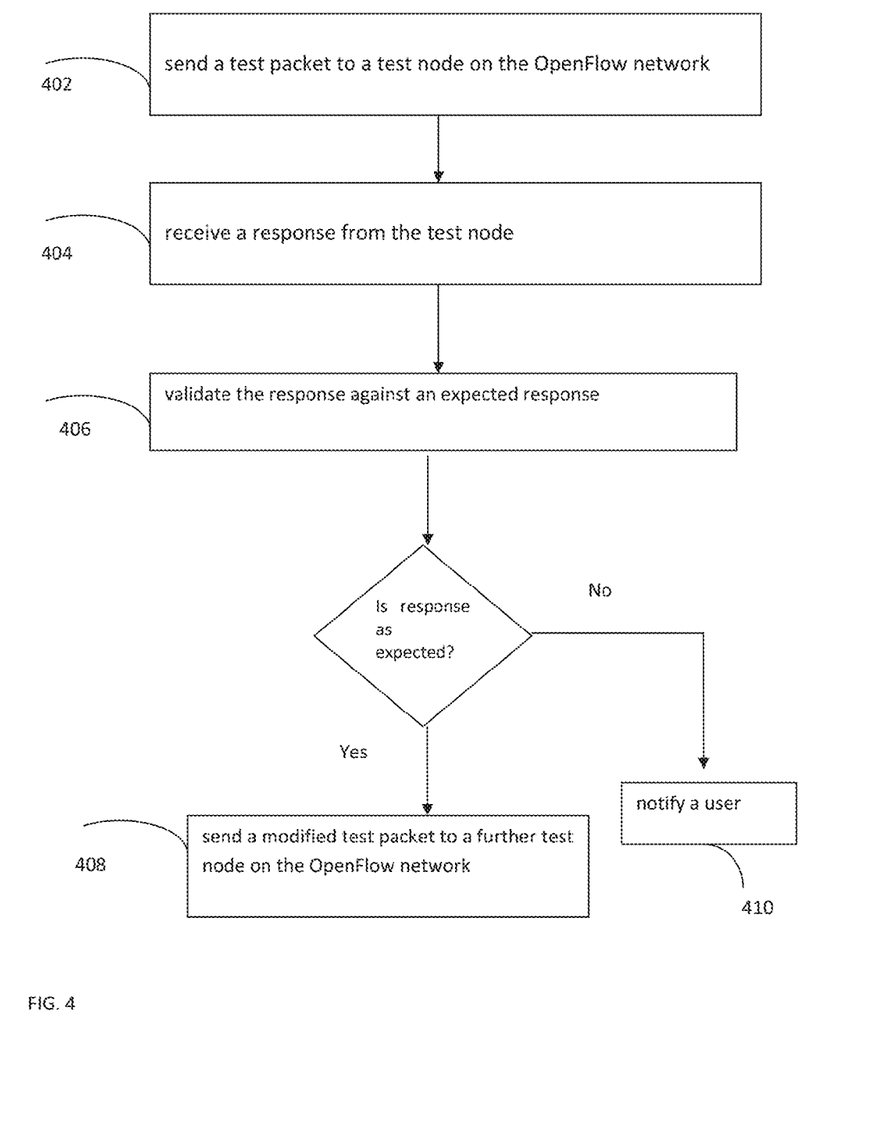
FIG. 4 shows a flow chart of a method, according to an example.

FIG. 4 shows a flow chart of a method of troubleshooting an OpenFlow network, according to an example. In an implementation, the method may be implemented in a software-defined computer network based on OpenFlow protocol. Details related to the OpenFlow protocol can be obtained from the web link https://www.opennetworking.org/images/stories/downloads/sdn-resources/onf-specifications/openflow/openflow-spec-v1.3.0.pdf In an implementation, it may be assumed that an OpenFlow controller (such as OpenFlow controller of FIG. 1) is aware of the network topology of a computer network system it is coupled to or a part of. At block 402, a test packet is sent to a test node (or a "first test node") on an OpenFlow-based network. An OpenFlow-based computer network may comprise of a plurality of network nodes (such as network switches, routers, etc.) along with an OpenFlow controller. To troubleshoot an issue in the OpenFlow network, a test packet is created for diagnosing an issue. A test-packet is a designated packet with an identification tag (for example, a marker bit or flag). The configuration of a test packet would depend on the type of network traffic it is meant to diagnose. For example, it could be Voice Over Internet Protocol (VoIP) traffic, Hypertext Transfer Protocol (HTTP) traffic, etc. In an implementation, a packet generator module of a network troubleshooting application on the OpenFlow controller inserts a test packet at a test node. The packet generator module instructs an OpenFlow controller to send a pkt_out message to a test node encapsulating a test packet and setting the action for that pkt_out message as an OFPP_TABLE action. In other words, a test packet is sent from the controller to a test node encapsulated in a pkt_out message. In an implementation, the test packet and the test node (in other words, "test inputs") that are to be used in a troubleshooting test are identified by an input generator module of the network troubleshooting application. In another instance, a test packet and a test node may be identified by a user such as a system administrator.

At block 404, a response is received from the test node. Once an OpenFlow controller sends out a test packet to a test node, it waits for a response from the test node. In the event no response is received from the test node, it means that there's an issue with the test node. For example, the test node could be down or there may be an issue with the network connection between the controller and the test node. In an instance, in such case, an error message may be presented to a user.

Figure 5:
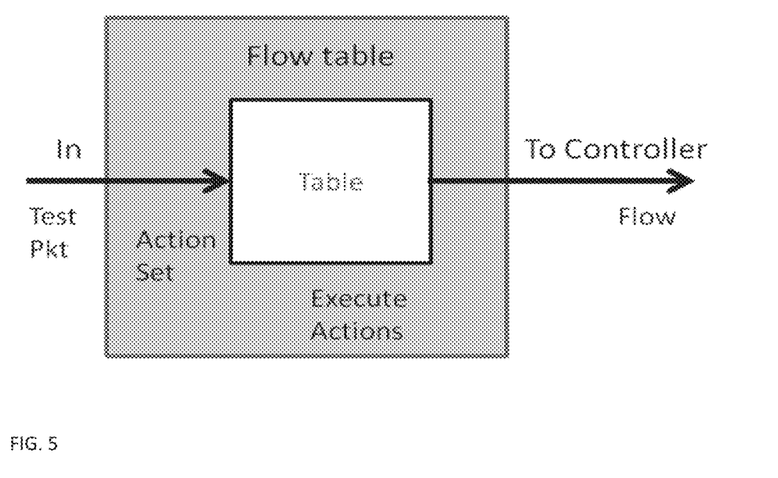
FIG. 5 is a block diagram illustrating the behavior of a network device in response to a test packet received from an OpenFlow controller, according to an example.

In an implementation, a test node upon receipt of a test packet drops a resultant packet (for example, a resultant packet may be dropped or no action may be taken on the resultant packet) and sends a copy of an OpenFlow flow corresponding to the test packet to the OpenFlow controller that had sent the test packet. In other words, an OpenFlow flow that matched the incoming test packet is sent to the OpenFlow controller. FIG. 5 illustrates the behavior of a network device ("test node") in response to a test packet received from an OpenFlow controller. Once a test packet arrives at a test node, the test node executes a set of actions. In an example, the set of actions may include dropping the test packet, identifying a flow corresponding to the test packet and sending the identified flow to an OpenFlow controller. In another implementation, the test node may not drop a resultant packet, and send both the resultant packet and the OpenFlow flow corresponding to the test packet to the OpenFlow controller.

At block 406, a response received from the test node is validated against an expected response.

An OpenFlow controller may expect a variety of responses from a test node in response to a test packet sent by the controller. In an example, the response may include receiving an OpenFlow flow from the test node. In such case a determination is made whether the received OpenFlow flow corresponds with the response expected by the controller. If the received OpenFlow flow does not match with a response expected by the controller, an error message may be presented to a user. In case, a response is according to a controller's expectation i.e. the response includes an OpenFlow flow corresponding to the test packet, the controller may further determine whether the response includes an action expected to be applied to the test packet. In an instance, if the response does not include an expected action, an error message may be presented to a user.

At block 408, if a response is consistent with the expected response, a modified test packet is sent to a further test node (or a "second test network node") on the OpenFlow network. In other words, if a response received from a test node matches with a response expected by an OpenFlow controller; the controller sends a further test packet to another test node on the network. Matching of a received response with an expected response (for instance, a received OpenFlow flow against an expected flow) indicates that there's no discrepancy in the network vis-à-vis the test node that had sent the response to the controller in the first place. In such case, the OpenFlow controller sends another test packet (albeit a modified one) to another test node on the OpenFlow network to determine if there's a discrepancy vis-à-vis another test node.

The OpenFlow controller generates a modified test packet based on the test packet (sent to the first test node) and the OpenFlow flow received from the test node in response to the sent test packet. A further test node is determined based on the OpenFlow flow received from the test node in response to the sent test packet.

Once a modified test packet is sent to a further test node on the OpenFlow network, the controller awaits from a response from the further test node. If a response is received, the controller validates the response from the further test node against an expected response. If the response from the further test node is consistent with the expected response, another modified test packet is sent to another test node on the OpenFlow network. On the other hand, if the response from the further test node is inconsistent with the expected response, a notification is provided to a user. In this manner, the sequence is followed until the last node on a specific path of a topology has been reached. At every network node, the OpenFlow controller waits to hear a response from the test node and validates the received response against an expected response. A discrepancy is notified to the user.

At block 410, if a response is inconsistent with an expected response, a notification is provided to a user. In other words, if a response received from a test node does not match with a response expected by an OpenFlow controller, an error notification is provided to a user. Thus, a user notification may be provided in a variety of situations. For example, in case no response is received from a test node in response to a test packet sent by an OpenFlow controller, an error message may be presented to a user. In another example, if a received OpenFlow flow does not match with a response expected by the controller, an error message may be presented to a user. In another instance, if a received response does not include an expected action, in such case also an error message may be presented to a user.

Figure 6:
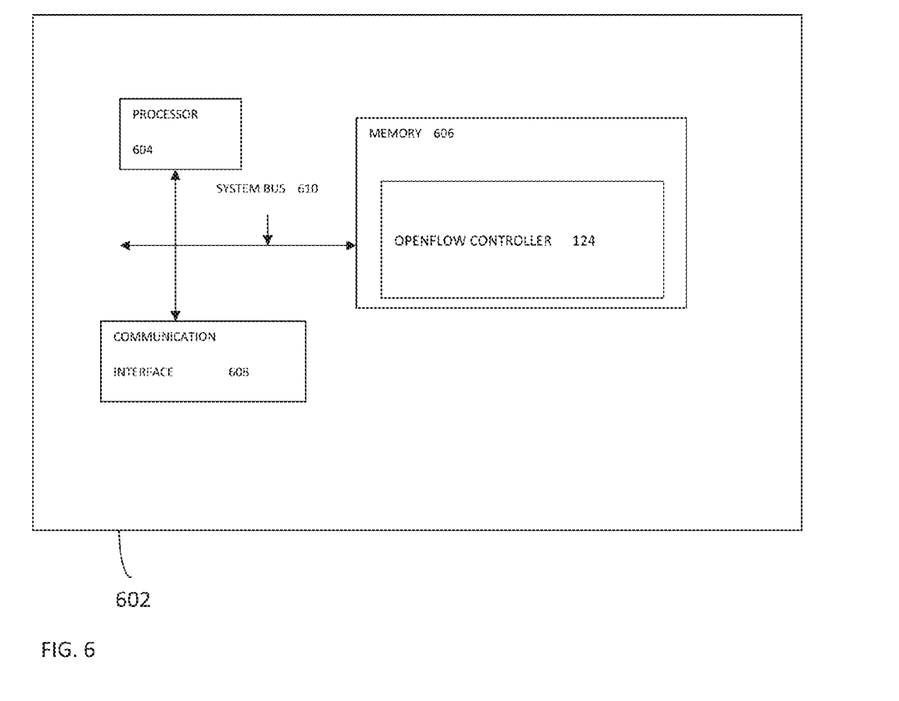
FIG. 6 is a schematic block diagram of an OpenFlow controller system hosted on a computer system, according to an example.

FIG. 6 is a schematic block diagram of an OpenFlow controller hosted on a computer system, according to an example.

Computer system 602 may include processor 604, memory 606, OpenFlow controller 124 and a communication interface 608. The components of the computing system 602 may be coupled together through a system bus 610.

Processor 604 may include any type of processor, microprocessor, or processing logic that interprets and executes instructions.

Memory 606 may include a random access memory (RAM) or another type of dynamic storage device that may store information and instructions non-transitorily for execution by processor 604. For example, memory 606 can be SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc. Memory 606 may include instructions that when executed by processor 604 implement OpenFlow controller 124.

Communication interface 608 may include any transceiver-like mechanism that enables computing device 602 to communicate with other devices and/or systems via a communication link. Communication interface 608 may be a software program, a hard ware, a firmware, or any combination thereof. Communication interface 608 may use a variety of communication technologies to enable communication between computer system 602 and another computer system or device. To provide a few non-limiting examples, communication interface 608 may be an Ethernet card, a modem, an integrated services digital network ("ISDN") card, etc.

In an implementation OpenFlow controller includes network troubleshooting application 300. OpenFlow controller 124 and its components may be implemented in the form of a computer program product including computer-executable instructions, such as program code, which may be run on any suitable computing environment in conjunction with a suitable operating system, such as Microsoft Windows, Linux or UNIX operating system. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

In an implementation, OpenFlow controller 124 may be read into memory 606 from another computer-readable medium, such as data storage device, or from another device via communication interface 608.

Proposed solution will enable network administrators to find out network paths that specific types of traffic will take in an OpenFlow network, prior to introduction of live traffic.

It will help troubleshoot the case where the actual path taken by the traffic is different from the expected network path. In case where network traffic does not reach an intended point in the network, proposed solution could be used to determine the point where the network traffic diverged from the intended path. In other words, discrepancies at the packet, flow and network path level could be identified thereby providing a thorough view of the OpenFlow network to the user (as illustrated in FIG. 2).

For the sake of clarity, the term "module", as used in this document, may mean to include a software component, a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of a computer system.

It would be appreciated that the system components depicted in FIG. 6 are for the purpose of illustration only and the actual components may vary depending on the computing system and architecture deployed for implementation of the present solution. The various components described above may be hosted on a single computing system or multiple computer systems, including servers, connected together through suitable means.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

We claim:

1. A method of troubleshooting an OpenFlow network, comprising:
   sending a test packet to a node on the OpenFlow network;
   receiving a response from the node;
   validating the response against an expected response;
   determining whether to send a second test packet to a second node on the OpenFlow network or provide a notification to a user based on whether the response matches the expected response;
   in response to the response matching the expected response:
      sending the second test packet to the second node
      receiving a second response from the second node;
      validating the second response from the second node against a second expected response; and
      determining, based on whether the second response matches the second expected response, whether to send a third test packet to a third node on the OpenFlow network or provide a notification to the user.

2. The method of claim 1, wherein the response includes an indication of an OpenFlow flow rule.

3. The method of claim 1, wherein the response includes an indication of an OpenFlow flow rule that the node determined to correspond to the test packet.

4. The method of claim 1, wherein the response includes an indication of an OpenFlow flow rule that the node determined to correspond to the test packet along with an indication of an action the node determined to be applicable to the test packet.

5. The method of claim 1, wherein the modified test packet is generated based on the test packet and an OpenFlow flow rule corresponding to the test packet that is indicated in the response received from the node.

6. The method of claim 1, wherein the test packet is sent by an OpenFlow controller on the OpenFlow network.

7. The method of claim 1, wherein the second node is determined based on a flow action indicated in the response received from the node.

8. A system, comprising:
   a processor; and
   a non-transitory processor readable medium storing instructions that, when executed by the processor, implement an OpenFlow controller to:
      send a test packet to a first network node on the OpenFlow network;
      receive a response from the first network node, the response comprising an indication of either or both of: a flow rule, and an action;
      validate the response against an expected response; and
      if the response matches the expected response, send a modified test packet to a second network node on the OpenFlow network; and
      if the response does not match the expected response, provide a notification to a user.

9. The system of claim 8, wherein the test packet is an encapsulated pkt_out message.

10. The system of claim 8, wherein the test packet includes an identification tag.

11. The system of claim 8, wherein the first network node and the second network node are network switches.

12. The system of claim 8, wherein the test packet and the first network node are defined by a user.

13. The system of claim 8, wherein the OpenFlow controller is further to:
   in response to the response matching the expected response:
      receive a second response from the second network node;
      validate the second response from the second network node against a second expected response;
      if the second response matches the second expected response, send a modified test packet to a third network node on the OpenFlow network; and
      if the second response does not match the second expected response, provide a notification to the user.

14. The system of claim 8, wherein the response includes an indication of an OpenFlow flow rule.

15. The system of claim 8, wherein the response includes an indication of an OpenFlow flow rule that the first network node determined to correspond to the test packet.

16. A non-transitory processor readable medium, the non-transitory processor readable medium comprising machine executable instructions, the machine executable instructions when executed by a processor causes the processor to:
   send a test packet to a network switch on the OpenFlow network;
   receive a response from the network switch, the response comprising an indication of either or both of: a flow rule, and an action;
   validate the response against an expected response; and
   if the response matches the expected response, send a modified test packet to a second network switch on the OpenFlow network; and
   if the response does not match the expected response, provide an error notification to a user.

17. The non-transitory processor readable medium 16, wherein the machine executable instructions further cause the processor to:
  in response to the response matching the expected response:
    receive a second response from the second network switch;
    validate the second response from the second network switch against a second expected response;
    if the second response matches the second expected response, send a modified test packet to a third network switch on the OpenFlow network; and
    if the second response does not match the second expected response, provide a notification to the user.

18. The non-transitory processor readable medium 16, wherein the response includes an indication of an OpenFlow flow rule.

19. The non-transitory processor readable medium 16, wherein the response includes an indication of an OpenFlow flow rule that the network switch determined to correspond to the test packet.

\* \* \* \* \*